(12) United States Patent  (10) Patent No.: US 7,703,826 B1
German  (45) Date of Patent: Apr. 27, 2010

(54) BED LINER RAIL SYSTEM FOR CARGO HOLDDOWN

(76) Inventor: Mark K. German, 1740 Lexington Ave., Uniontown, PA (US) 15401

( * ) Notice: Subject to any disclaimer, the term of this patent is extended or adjusted under 35 U.S.C. 154(b) by 645 days.

(21) Appl. No.: 11/518,053

(22) Filed: Sep. 8, 2006

(51) Int. Cl.
*B60R 13/01* (2006.01)

(52) U.S. Cl. ............ 296/39.2; 296/37.6; 410/104; 410/105; 410/113

(58) Field of Classification Search ......... 296/39.1, 296/39.2, 40, 37.6; 410/104, 105, 109, 112, 410/113
See application file for complete search history.

(56) References Cited

U.S. PATENT DOCUMENTS

| | | | |
|---|---|---|---|
| 4,333,678 A | | 6/1982 | Munoz et al. |
| 4,767,149 A | * | 8/1988 | Rye ............ 296/39.2 |
| 4,955,771 A | * | 9/1990 | Bott ............ 410/94 |
| 4,974,895 A | * | 12/1990 | Davenport ....... 296/39.2 |
| 5,080,418 A | * | 1/1992 | Semple et al. ..... 296/39.2 |
| 5,755,481 A | * | 5/1998 | Emery ........... 296/39.1 |
| 5,788,309 A | * | 8/1998 | Emery et al. ..... 296/39.1 |
| 5,882,058 A | * | 3/1999 | Karrer .......... 296/39.2 |
| 5,998,770 A | * | 12/1999 | Sundby .......... 219/528 |
| 6,022,061 A | * | 2/2000 | Emery et al. ..... 296/39.1 |
| 6,059,343 A | * | 5/2000 | Emery .......... 296/39.2 |
| 6,170,897 B1 | | 1/2001 | Karrer |
| 6,237,980 B1 | | 5/2001 | Miles et al. |
| 6,511,270 B1 | | 1/2003 | Burke et al. |
| 6,692,054 B2 | * | 2/2004 | Vitoorapakorn ..... 296/39.2 |
| 7,059,647 B1 | * | 6/2006 | Sierakowski et al. .... 296/39.1 |
| 7,157,377 B2 | * | 1/2007 | Garza et al. ...... 438/694 |
| 7,390,154 B2 | * | 6/2008 | Womack et al. .... 410/105 |
| 7,547,170 B2 | * | 6/2009 | Womack et al. .... 410/105 |
| 2004/0090077 A1 | | 5/2004 | Montagna |

OTHER PUBLICATIONS

European Search Report, EP 07017312, Jan. 7, 2008.

* cited by examiner

*Primary Examiner*—Glenn Dayoan
*Assistant Examiner*—Gregory Blankenship
(74) *Attorney, Agent, or Firm*—Alan G. Towner, Esq.; Pietragallo Gordon Alfano Bosick & Raspanti, LLP

(57) ABSTRACT

An essentially flat base of a bed liner is positioned on a vehicle cargo bed. The base includes a forward edge and a rear edge. A plurality of panels extend upwardly from the base. A front panel includes a protrusion projecting beyond the base forward edge. The base includes one or more continuous recessed channels extending from the base rear edge to the protrusion. Each channel includes a continuous track for receiving a movable tie-down device. The tie-down device includes a portion contoured to slide within the track and an anchor portion.

12 Claims, 9 Drawing Sheets

BED LINER RAIL SYSTEM FOR CARGO HOLDDOWN

BACKGROUND OF THE INVENTION

1. Field of the Invention

This invention relates to a cargo securing system for a vehicle cargo bed and, more particularly, to an apparatus and method for securing cargo in a pickup truck bed liner cargo area with a slidable tie-down device.

2. Description of the Related Art

Vehicles that include cargo areas, such as vans and pickup trucks, have achieved great popularity. Pickup trucks typically have a cargo bed with a substantially rectangular horizontal floor frequently between four and six feet wide and six and ten feet long, and with vertical sides between one and three feet high. Typically, stationary walls form the front and two adjacent sides, and a removable or hinged tailgate forms the remaining rear side and provides access to the bed floor for cargo loading and unloading. The trucks are thus particularly suited to carry any article of most any size, even approximating the bed size.

A pickup truck may include a device for dividing the cargo bed. U.S. Pat. No. 5,044,682 discloses a bed liner divider system that divides a pickup truck cargo area into multiple sections. The system includes a pair of slotted brackets that attach to the pickup truck bed side walls using conventional fastening techniques. The brackets are mounted on the side walls, so that the slots are aligned vertically. A divider wall is inserted into the slots to form the separate sections of the pickup truck cargo area.

Vans may also include devices for dividing the cargo area. U.S. Pat. No. 5,167,479 discloses a van cargo area divider that includes a beam member and a pair of track members. The track members are slider mechanisms that insert into channels that form a pair of integral tracks within the van cargo area floor. Each slider mechanism attaches to an end cap positioned at opposite ends of the beam member. The beam member divides the cargo area into multiple sections.

Pickup truck bed floors are typically smooth and flat, so that any carried article(s) smaller than the cargo bed itself can slide about on the bed floor under the dynamic forces created when the truck is being driven. The cargo bed will typically include a bed liner that has one or more surfaces with a higher coefficient of friction.

U.S. Pat. No. 6,237,980 discloses a plastic vehicle bed liner for use in a cargo bed. The bed liner includes a relatively rigid body having a bottom wall member for frictionally engaging the vehicle cargo bed. A pair of side wall members and a front wall member project upwardly from the bottom wall member. Each wall member includes a wear inhibiting area covering at least a portion of the wall member outer surface for engaging a corresponding member of the vehicle cargo bed.

U.S. Pat. No. Des. 302,143 discloses an ornamental design for a vehicle cargo space bed liner. The bed liner includes a plurality of shallow walls lengthwise along the base of the bed liner.

U.S. Patent Application Publication No. 2002/0149223 discloses a knock-down, multi-component bed liner. The bed liner includes five sections, a front panel assembly, a left side assembly, a right side assembly, a center bottom panel, and a tailgate panel. The left side assembly and the right side assembly attach to the bottom panel to form the bed liner floor. The assemblies are attached to one another by strips or flanges that receive conventional fasteners that are inserted into a plurality of spaced-apart openings or apertures.

While plastic bed liners for the cargo bed typically provide greater friction against the carried article(s), the bed liners do not always prevent a carried article(s) from sliding around in the bed. A sliding article could fall from the truck, or could smash against the cargo bed sides to cause damage to the truck or itself and/or create instability in the driving characteristics of the truck. Thus, it is desirable and common when easily possible to secure the carried article(s) relative to the bed.

One common way of securing these carried article(s) relative to the cargo bed includes the use of a cargo securing system. U.S. Pat. No. 5,509,764 discloses a metal cargo securing system having a crossbar member attached to a beam member. The beam member includes ends that are adapted to slide within a pair of U-shaped channel tracks that are mounted on the bed walls of the pickup truck bed.

Cargo securing systems may include one or more fastener assemblies. U.S. Pat. No. 6,827,531 discloses a slidable, retainable fastener assembly for attaching to a track that is mounted to or near a truck bed. The fastener assembly includes an anchor portion and a bottom portion. The anchor portion includes one or more eyelets, hooks, rings, carabiners, clamps, clasps, or other suitable tie-down members. The bottom portion slides within the track slot. The bottom portion includes a retainer that engages a pair of opposing extension positioned on the track upper, open portion. The retainer includes a pair of upper surfaces specially contoured to conform to the ribs and abscesses on each extension.

Other cargo securing systems utilize tracks that are integral with the cargo bed floor. U.S. Pat. No. 6,712,568 discloses a cargo bed having a pair of integral tracks within the cargo bed floor and a tie-down system that uses the integral tracks. The tracks include channels that essentially extending lengthwise along the cargo bed base. The channels receive fittings that facilitate the attachment of various objects to the cargo bed. Unfortunately, the cargo securing system cannot be used with a truck bed liner that covers the entire cargo bed floor.

U.S. Pat. No. 6,511,270 discloses a cargo clamp system that can be used with a truck bed liner that covers the entire cargo bed floor. The bed liner includes a plurality of corrugations that define a plurality of troughs extending lengthwise along the bed liner base. The clamp system includes a pair of jaws that attach the clamp system to the bed liner. Unfortunately, the existing cargo clamp system must be used with a bedliner that includes corrugations. Accordingly, there is a need for an improved cargo securing system that can be used with corrugated or non-corrugated bed liners.

SUMMARY OF THE INVENTION

In accordance with the present invention there is provided a bed liner for use in a vehicle cargo bed. A bottom wall member engages the vehicle cargo bed. A pair of side wall members connects to the bottom wall member and extends upwardly therefrom. The side wall members are adapted to correspond with and follow a pair of side walls in the vehicle cargo bed. A front wall member connects to the bottom wall member and extends upwardly therefrom and is adapted to follow a front wall of the vehicle cargo bed front wall. The bottom wall member has a longitudinal channel that forms a continuous track for receiving a tie-down device therein.

Further in accordance with the present invention, there is provided a cargo securing system for use in a vehicle cargo bed. A body has an essentially flat base and a plurality of panels extending upwardly from the base. The base has a channel forming a continuous track extending along the length of the base. A tie-down device has a bottom portion and an anchor extending upwardly from the bottom portion. The tie-down device bottom portion is contoured for insertion into the track to facilitate repositioning of the anchor along the length of the base.

Further in accordance with the present invention, there is provided a method for manufacturing bed liner for use in a vehicle cargo bed. A softened sheet of moldable material having a plurality of panel forming sections extending from a base forming section is provided. A portion of the moldable material is pushed from at least one of the panel forming sections to the base forming section to provide sufficient material to facilitate the formation of a channel within the base. The sheet is deformed to form a base from the base forming section and a plurality of panels from the panel forming sections with the base having a longitudinally extending channel for receiving a tie-down device therein.

Further in accordance with the present invention, there is provided a bed liner for use in a vehicle cargo bed. An essentially flat base engages the vehicle cargo bed. The base includes a forward edge and a rear edge. A pair of side panels extends upwardly from the base. A front panel extends upwardly from the base with a protrusion projecting beyond the base forward edge. The base includes a continuous channel essentially extending from the base rear edge to the protrusion to form a continuous recessed track for receiving a tie-down device.

Accordingly, a principal object of the present invention is to provide a cargo bed liner having an extended longitudinal track for receiving a slidable tie-down device.

Another object of the present invention is to provide an integrally molded track in a cargo bed liner.

A further object of the present invention is to provide a cargo securing system that includes a pickup truck bed liner with a longitudinal track molded therein and a slidable tie-down device.

A further object of the present invention is to provide a method for manufacturing a cargo bed liner that includes a longitudinal track for receiving a slidable tie-down device.

These and other objects of the present invention will be more completely described and disclosed in the following specification, accompanying drawings, and appended claims.

DESCRIPTION OF THE PREFERRED EMBODIMENTS

Figure 1:
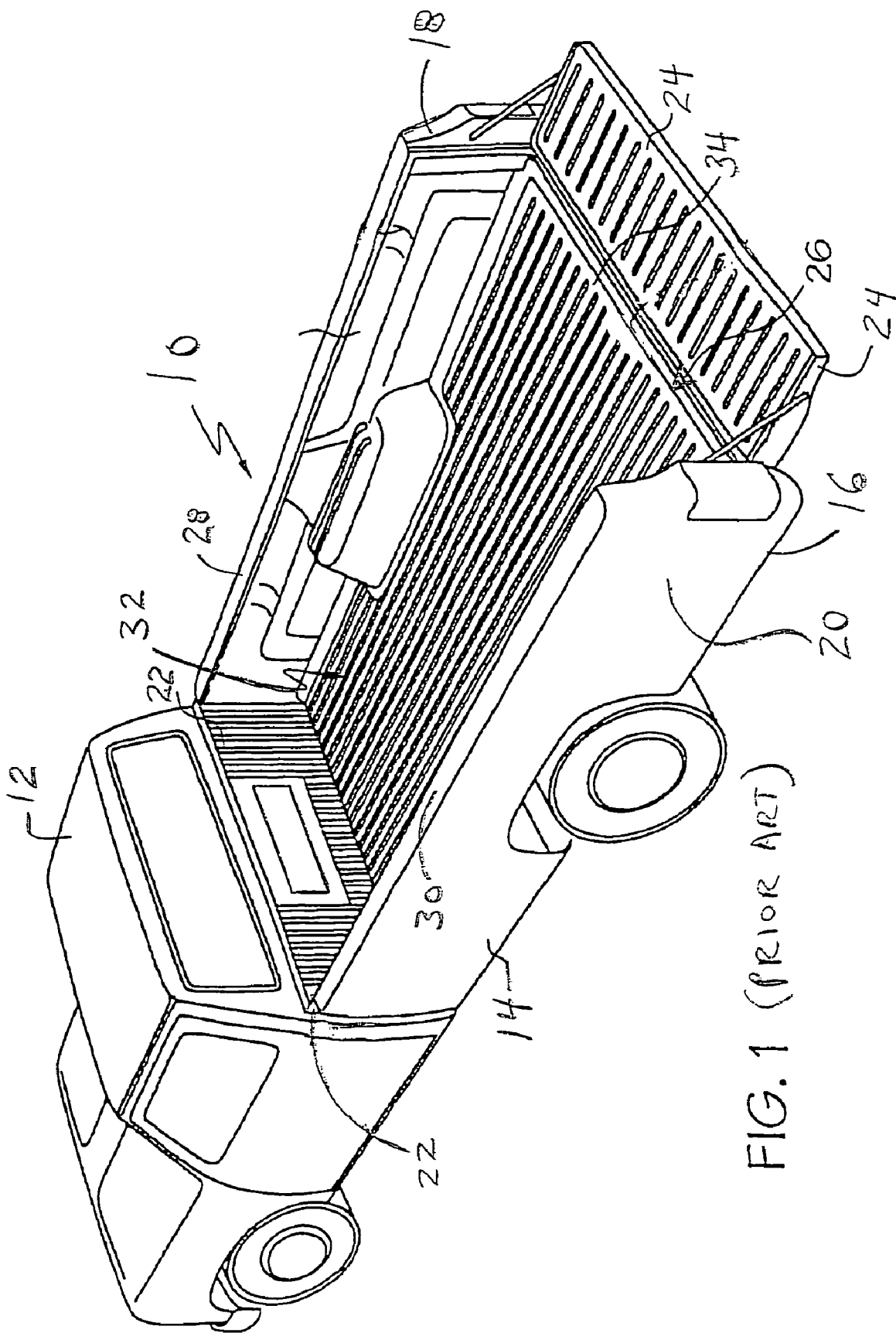
FIG. 1 is an isometric view of a pickup truck, illustrating a cargo bed liner with a cargo securing system of the present invention.
Figure 2:
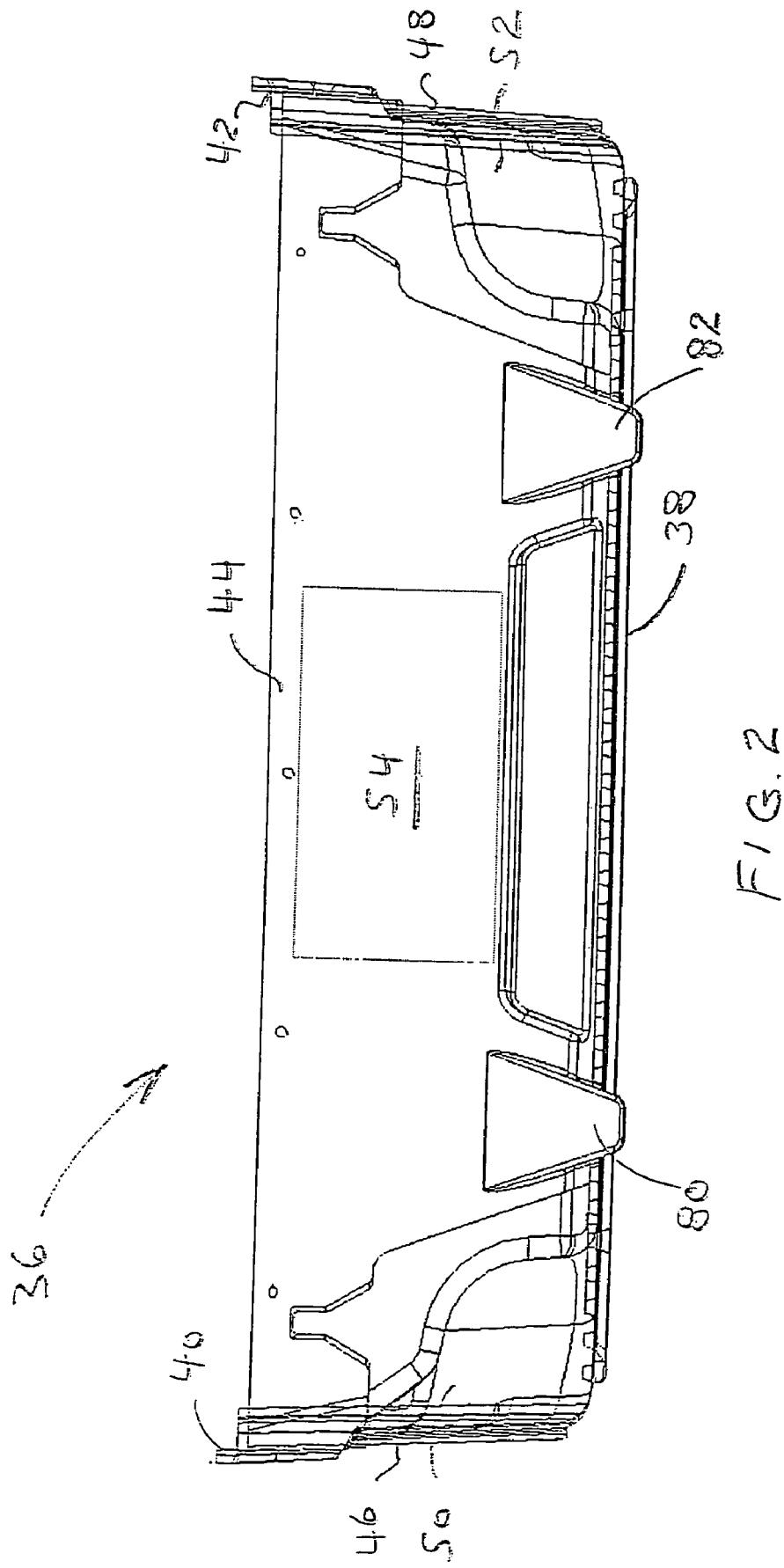
FIG. 2 is a front end view of the bed liner shown in FIG. 1, illustrating protrusions extending from the bed liner front wall to receive the cargo securing system.
Figure 3:
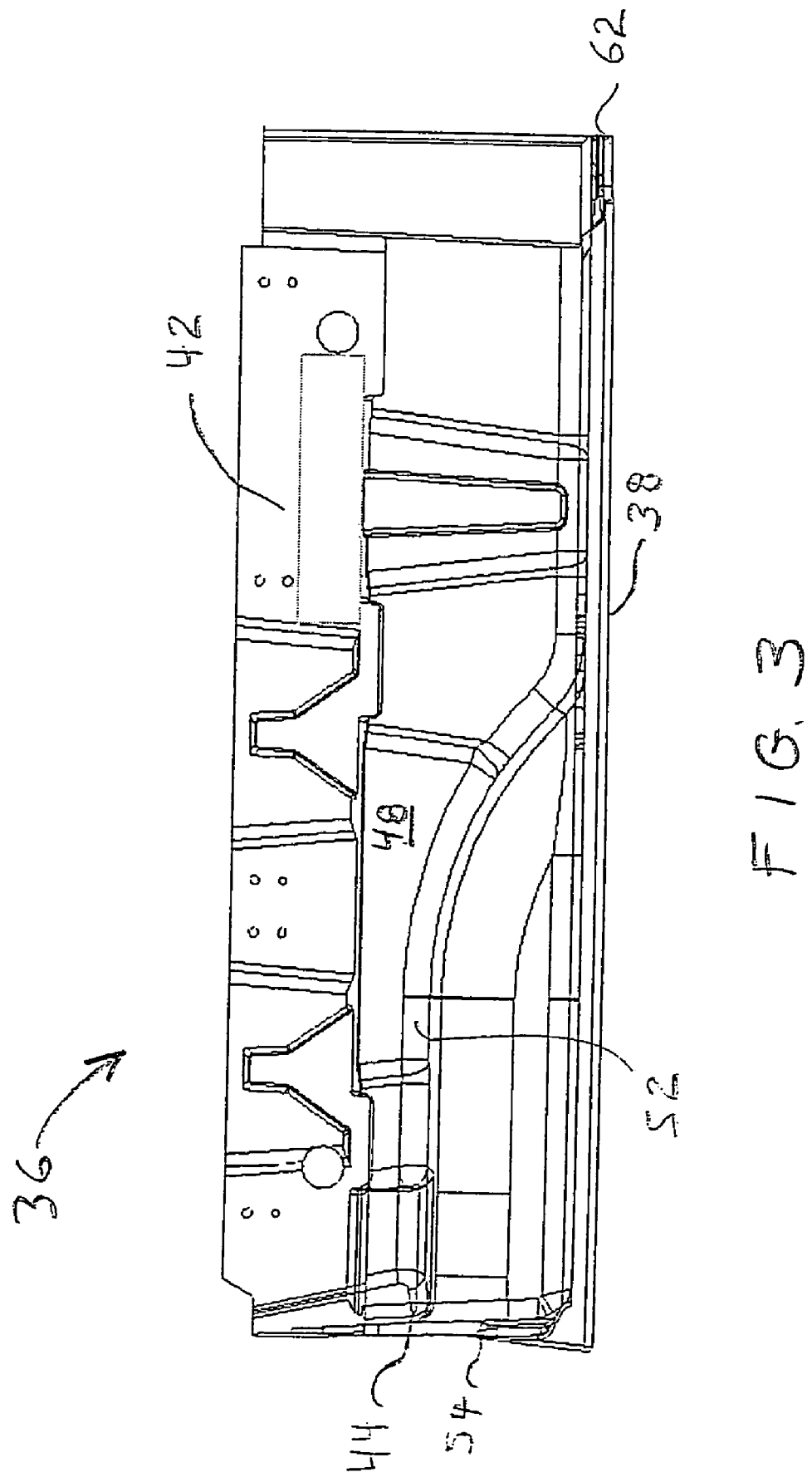
FIG. 3 is a view in side elevation of the bed liner shown in FIG. 2.

Referring to the drawings and particularly to FIG. 1, there is illustrated a conventional pickup truck generally designated by the numeral 10 having an operator's cab 12 and a cargo bed 14. The cargo bed 14 includes a floor or bottom wall 16, two oppositely positioned side walls 18, 20, and a front wall 22. The cargo bed 14 also includes a tailgate 24 which forms with the bottom wall 16, the side walls 18, 20, and the front wall 22 a cargo compartment generally designated by the numeral 26 for the storage of cargo.

As is well known in the art, the bottom wall 16 may be substantially planar and may include a plurality of ridges to facilitate drainage of water or other liquids from the cargo bed. The side walls 18, 20 extend vertically from the bottom wall 16 in spaced parallel relationship. Each side wall 16, 18 includes a top rail 28, 30 extending longitudinally the length of the bed. The structure of the side walls 18, 20, front wall 22 and top rails 28, 30 vary considerably between different makes and models of trucks as to dimensions and configuration.

The cargo bed 14 conventionally includes a bed liner 32 for protecting the cargo compartment 26. The bed liner 32 is positioned in the cargo bed 14 to cover the front wall 22, bottom wall 16, and side walls 18, 20. The bed liner 32 includes a bottom wall 34 that is adapted to fit on and substantially cover the full length and width of the cargo bed bottom wall 14. The liner bottom wall 34 normally has a width substantially as great as the distance between the truck bed rails 28, 30. In a conventional manner, the liner bottom wall 34 includes a plurality of separate inverted U-shaped longitudinal corrugations.

Referring now to FIGS. 2-5, there is illustrated a cargo bed liner generally designated by the numeral 36 corresponding to a preferred embodiment of the present invention. The bed liner 36 includes a bottom wall member or base 38 and a plurality of panels 40, 42, 44 that extend upwardly from the base 28. Each of the panels 40, 42, 44 is connected to the base 38. The panels 40 and 42 are side wall members. The panel 44 is a front wall member. In the preferred embodiment, the panels 40, 42, 44 are integrally molded with the base 38.

The side panels 40, 42 are integrally formed with the base 38 to conform to the inner contours of the side walls 18, shown in FIG. 1. The panels 40, 42 include outer surfaces 46, 48. Each side wall 40, 42 includes a wheel well 50, 52 that is extends upwardly from the base 38. The wheel wells 50, 52 are adapted to accommodate truck cargo bed rear wheel wells (not shown).

The front panel 44 is integrally formed with the base 38 to conform, so that an outer surface 54 conforms to the inner contour of the front wall 22 shown in FIG. 1. The panel 44 also includes an inner surface 56 that connects to an upper surface 58 on the base 38 to form a continuous surface for the bed liner 32. The front wall member 44 connects the two side wall members 40, 42 to one another, so that the bed liner 32 is complementary with the cargo bed 12 at the front wall, side walls 16 and 18 and bottom wall 14 to completely cover and protect the surfaces of the cargo bed 12.

Referring now to FIGS. 2-6, the base 38 includes a front edge 60 and a rear edge 62. A pair of C-shaped channels 64, 66 essentially extends from the base front edge 60 to the base rear edge 62. The channels 64, 66 are essentially aligned parallel to the corrugations in the base 38. The channels 64, 66 connect to and communicate with a pair of trapezoid shaped slots 68, 70 in the front wall member inner surface 56. The channels 64, 66 and the slots 68, 70 form a pair of continuous tracks 72, 74.

The tracks 72, 74 are formed during the manufacture of the bed liner 36. The bed liner 36 is made from any suitable material and is fabricated through any conventional manufacturing process, such as thermoforming, profile extrusion, injection molding, blow molding, or rotational molding. The bed liner 36 is preferably formed of high density polyethylene in a single, integral unit.

In the preferred embodiment, the bed liner 36 is manufactured using a thermoforming process in which a sheet of moldable material is heated to a suitable temperature for molding. The moldable material includes a plurality of panel forming sections that extend from a base forming section.

The sheet is heated until the material is sufficiently softened, so that material can be moved from the panel forming sections to a base forming section. Once the sheet is sufficiently softened, a portion of the moldable material is pushed from at least one of the panel forming sections to the base forming section. The additional material provides sufficient material to facilitate the formation of the channels 64, 66 within the base 38.

Next, the sheet is draped over a mold to form the base 38 from the base forming section. The panels 40, 42, 44 and the wheel wells 50, 52 are formed from the panel forming sections. The front member panel 44 is deformed to include the slots 68, 70, so that the channels 64, 66 and the slots 68, 70 form the tracks 72, 74.

Figure 4:
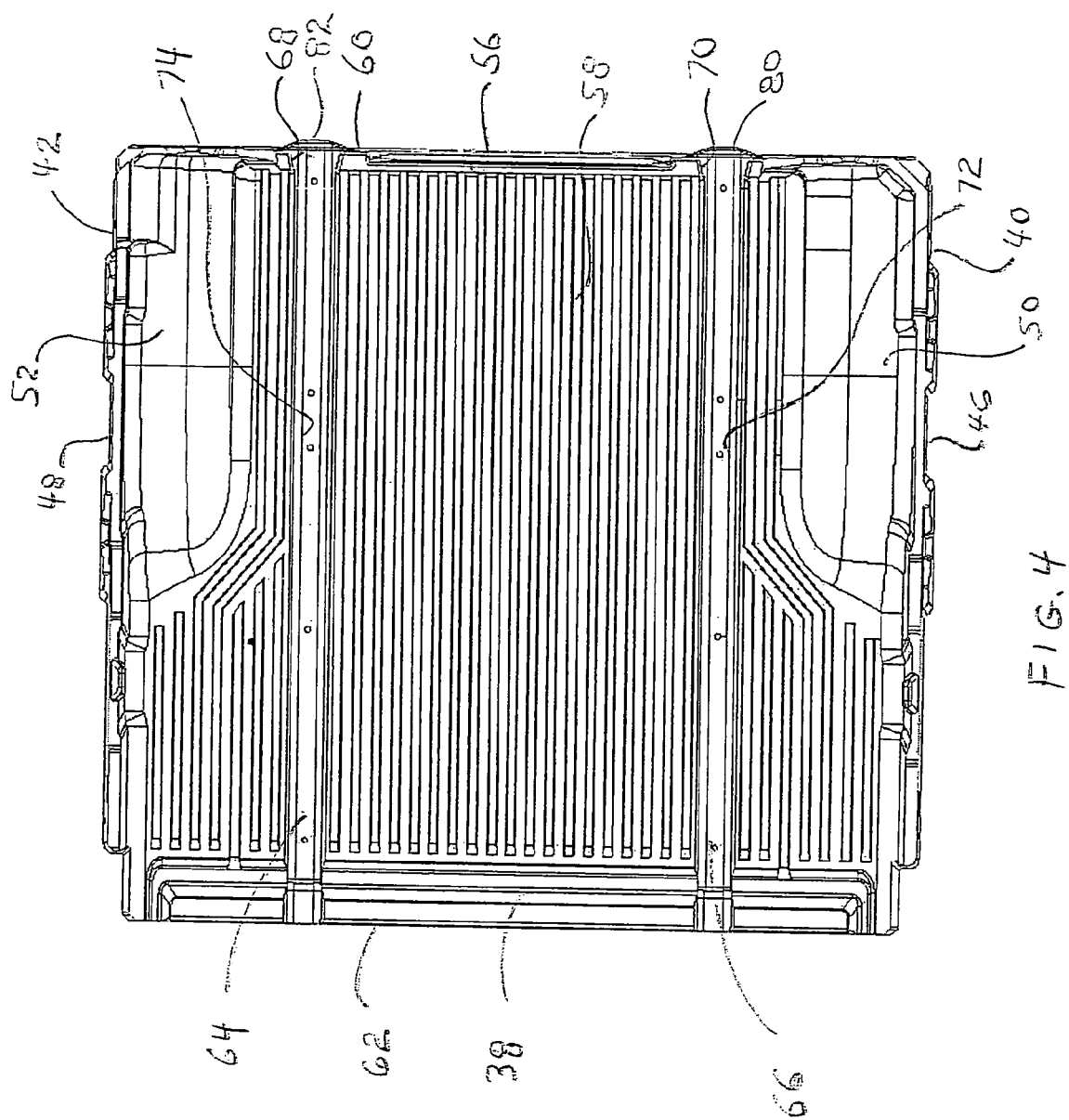
FIG. 4 is a top plan view of the bed liner shown in FIG. 2.
Figure 5:
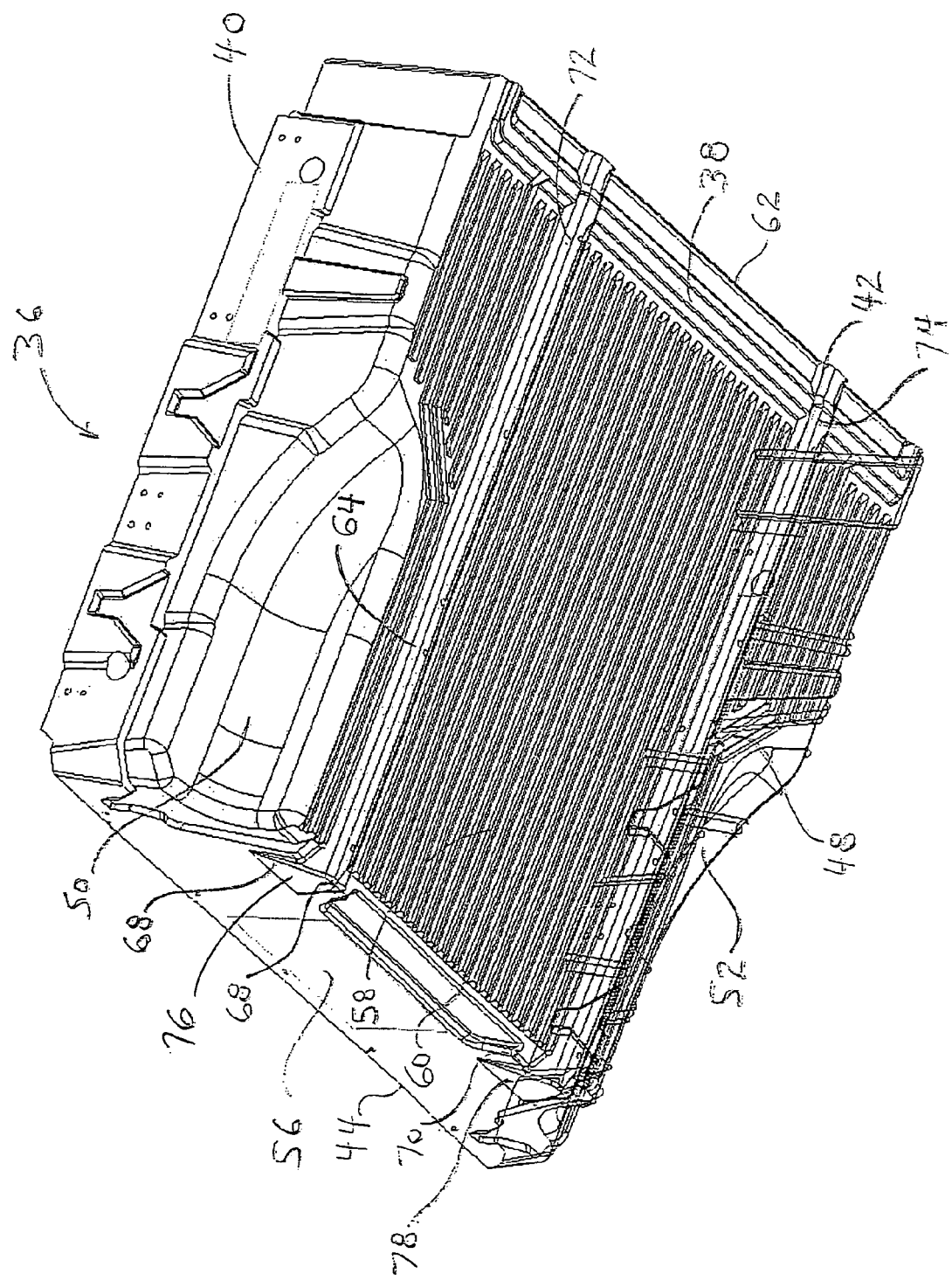
FIG. 5 is an isometric view of the bed liner shown in FIG. 2, illustrating longitudinally extending channels to receive the cargo securing system.
Figure 6:
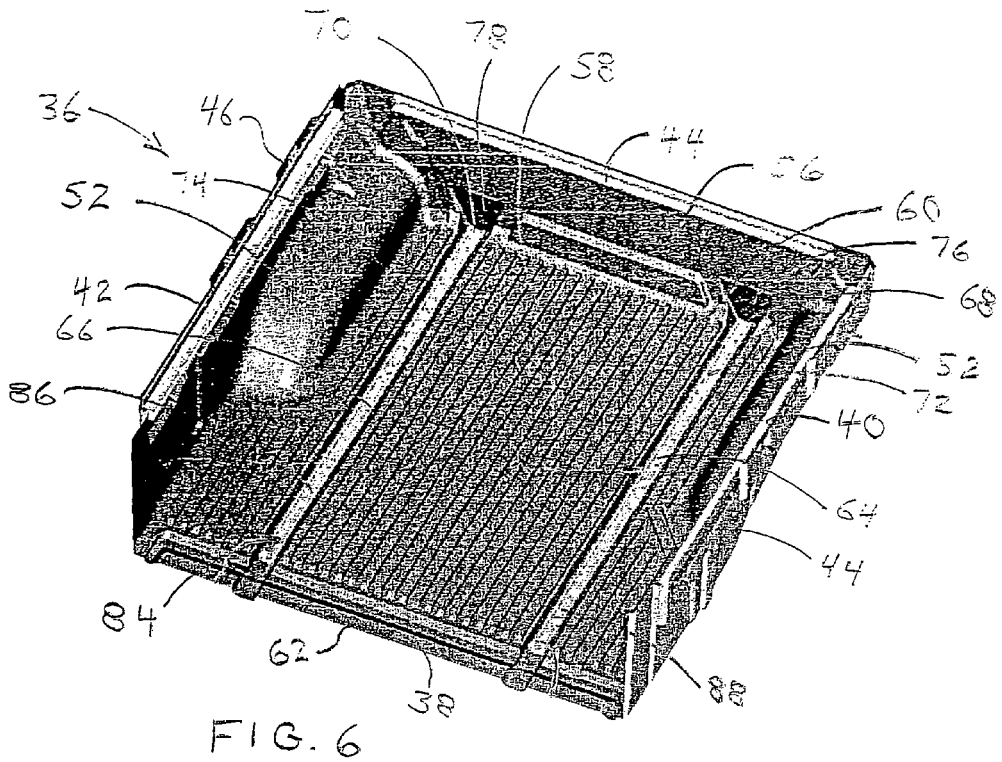
FIG. 6 is an isometric view of the bed liner, illustrating the cargo securing system positioned in channels in the bed liner floor.
Figure 7:
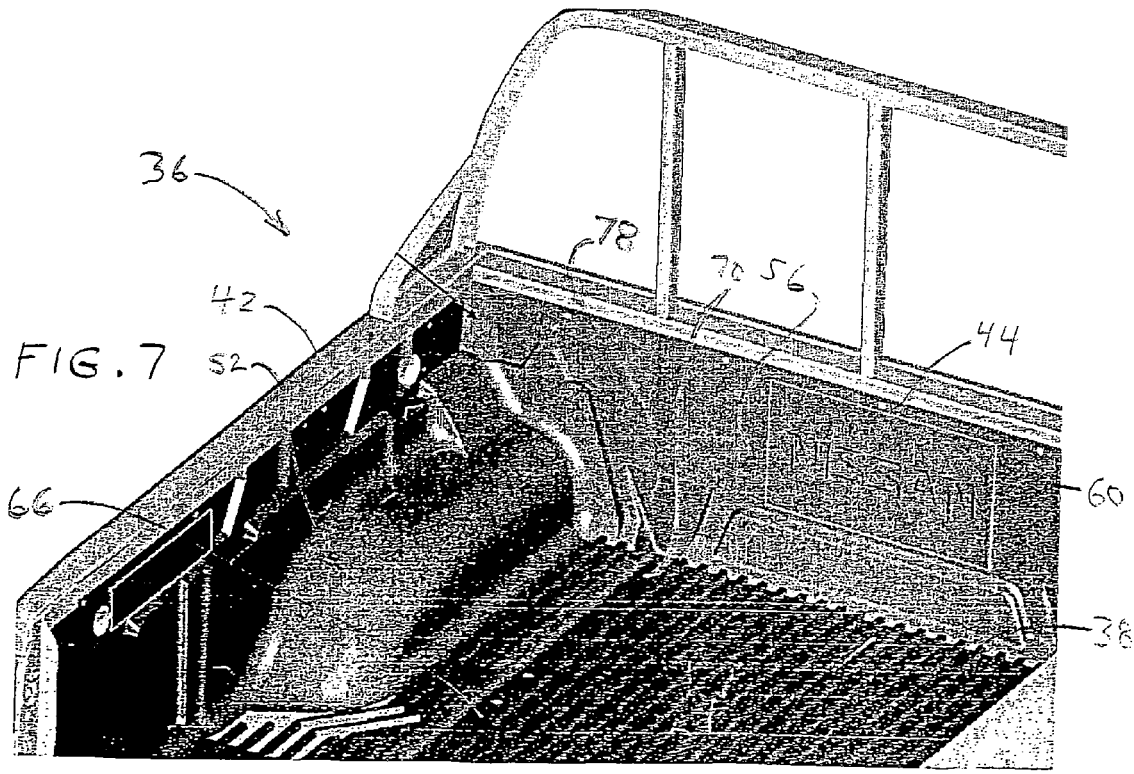
FIG. 7 is a fragmentary isometric view of the bed liner, illustrating the channel and protrusion in the liner for receiving the cargo securing system.
Figure 8:
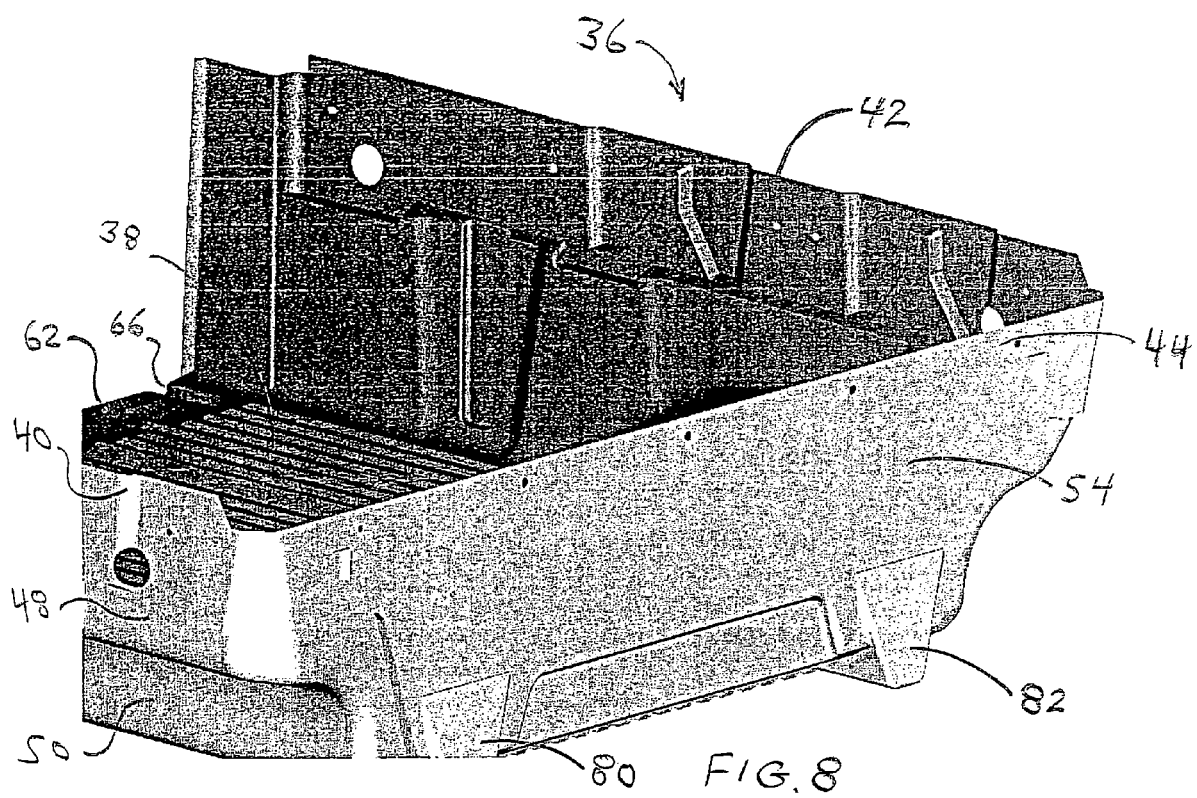
FIG. 8 is a fragmentary isometric view of the bed liner, illustrating the protrusion extending from the front wall.

As shown in FIGS. 4 and 5, the front member panel inner surface 56 includes a pair of indentations 76, 78 that define the slots 68, 70. The formation of the indentations 76, 78 during the molding process causes the outer surface 54 to extend outwardly or protrude from the front wall panel 44 to form a pair of protrusions 80, 82 (shown in FIGS. 2, 4, and 8). The protrusions 80, 82 permit the tracks 72, 74 to extend beyond the base front edge 60 to the front wall panel 44. This expands the range of the tracks 72, 74 for securing cargo in the vehicle cargo compartment 26. The tracks 72, 74 do not extend above the base upper surface 58.

Figure 9:
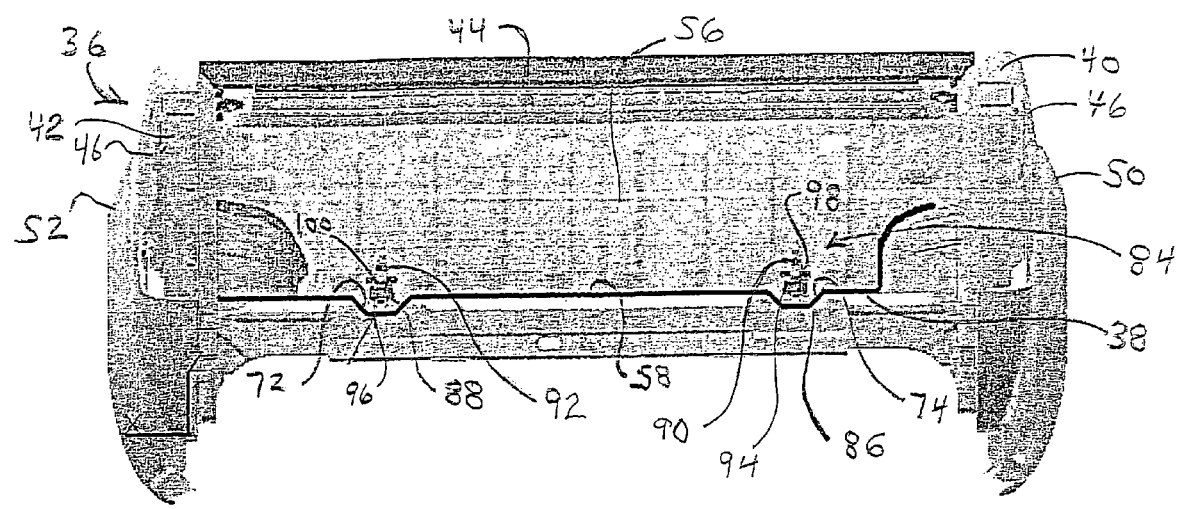
FIG. 9 is an end view of the bed liner, illustrating the cargo securing system positioned in the channels of the bed liner floor.
Figure 10:
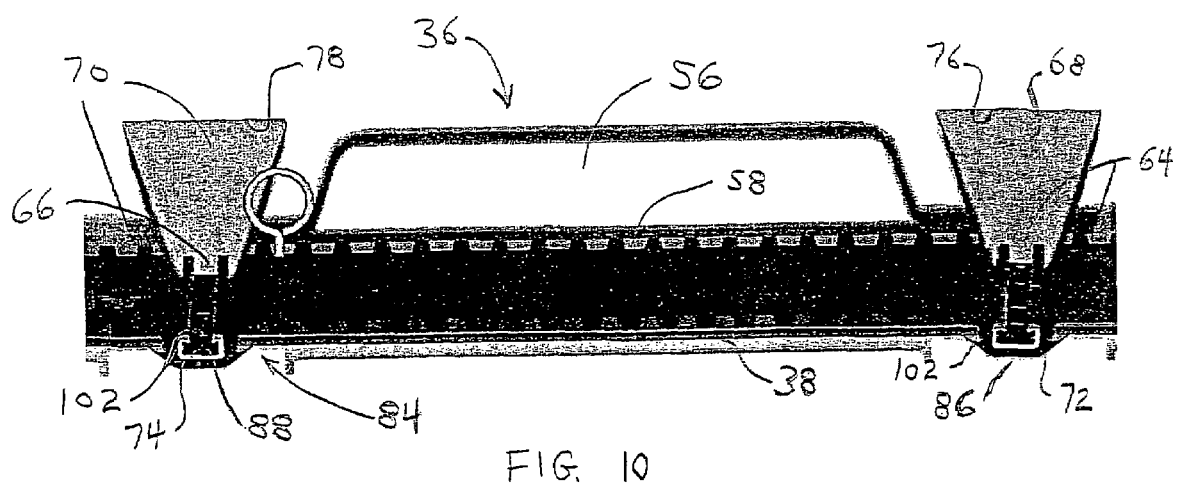
FIG. 10 is an enlarged fragmentary end view of the bed liner, illustrating the cargo securing system.

Referring now to FIGS. 9 and 10, the bed liner 36 is part of a cargo securing system generally designated by the numeral 84. The cargo securing system 84 also includes a pair of rails 86, 88 and a pair of tie down devices 90, 92 (shown in FIG. 9) for insertion into the rails 86, 88. The rails 86, 88 are inserted into the tracks 72, 74 for connection to the bed liner 36. Preferably, the rails 86, 88 do not extend above the base upper surface 58.

As shown in FIG. 9, the tie-down device 90, 92 includes bottom portions 94, 96 and anchors 98, 100. The anchors 98, 100 extend upwardly from the bottom portion 94, 96 to facilitate connection to one or more ropes (not shown). The bottom portions 94, 96 conform to the inner contour of the rails 86, 88, so that the tie-down devices 90, 92 slide within the tracks 72, 74.

As shown in FIG. 10, the rails 86, 88 include a plurality of slots or holes 102 to facilitate repositioning of the tie-down devices 90, 92 within the tracks 72, 74.

It should be understood that alternative tie-down devices are contemplated in accordance with the present invention that include one or more eyelets, hooks, rings, carabiners, clamps, clasps, or other suitable tie-down members.

According to the provisions of the patent statutes, I have explained the principle, preferred construction and mode of operation of my invention and have illustrated and described what I now consider to represent its best embodiments. However, it should be understood that, within the scope of the appended claims, the invention may be practiced otherwise than as specifically illustrated and described.

I claim:

1. A bed liner for use in a vehicle cargo bed comprising:
a bottom wall member engaging the vehicle cargo bed,
a pair of side wall members connected to said bottom wall member and extending upwardly therefrom,
said side wall members being adapted to correspond with and follow a pair of side walls in the vehicle cargo bed,
a front wall member connected to said bottom wall member and extending upwardly therefrom and being adapted to follow a front wall of the vehicle cargo bed front wall, and
said bottom wall member having a longitudinal channel forming a continuous track for receiving a tie-down device therein,
wherein an inner surface of said front wall member includes a channel communicating with said bottom wall member channel to form said continuous track,
wherein said bottom wall member includes a forward edge,
wherein said front wall member channel extends into said front wall member to form a protrusion extending outwardly beyond said bottom wall member forward edge, and
wherein said continuous track extends beyond said bottom wall member forward edge.

2. A bed liner as set forth in claim 1 in which:
said track includes at least one continuous rail extending along said channel.

3. A bed liner as set forth in claim 1 which includes:
said track being recessed in said bottom wall member and thereby being positioned below an upper surface of said bottom wall member.

4. A bed liner as set forth in claim 1 in which:
said bottom wall member includes a plurality of channels forming a plurality of tracks.

5. A bed liner for use in a vehicle cargo bed comprising:
a base engaging the vehicle cargo bed,
said base including a forward edge and a rear edge,
a pair of side panels extending upwardly from said base,
a front panel extending upwardly from said base with a protrusion projecting beyond said base forward edge,
said base including a continuous recessed channel essentially extending from said base rear edge to said protrusion, and
a continuous track formed by said channel for receiving a tie-down device,
wherein said front panel includes an inner surface having a slot forming said protrusion and communicating with said base channel to form said continuous track,
wherein said base includes a forward edge, and
wherein said protrusion of said front panel protruding outwardly so that said continuous track extends beyond said base forward edge.

6. A bed liner as set forth in claim 5 which includes:
said base being integral with said side panels and said front panels.

7. A bed liner as set forth in claim 5 which includes:

said track being positioned below an upper surface of said base.

8. A bed liner as set forth in claim 5 which includes:

a plurality of protrusions extending from said front panel, a plurality of tracks, and wherein each track essentially extends from said base rear edge to one of said front panel protrusions.

9. A bed liner as set forth in claim 5 which includes:

said tie-down device having a bottom portion and an anchor extending upwardly from said bottom portion, and said tie-down device bottom portion contoured for insertion into said track to facilitate repositioning of said anchor along the length of said base.

10. A bed liner as set forth in claim 5 in which:

said track includes at least one rail extending along said base channel.

11. A bed liner as set forth in claim 5 which includes:

said base having recessed a recessed upper surface, and said track being positioned below said base upper surface.

12. A bed liner as set forth in claim 5 in which:

said base includes a plurality of channels forming a plurality of tracks.

* * * * *

UNITED STATES PATENT AND TRADEMARK OFFICE
CERTIFICATE OF CORRECTION

| | | |
|---|---|---|
| PATENT NO. | : 7,703,826 B1 | Page 1 of 1 |
| APPLICATION NO. | : 11/518053 | |
| DATED | : April 27, 2010 | |
| INVENTOR(S) | : Mark K. German | |

It is certified that error appears in the above-identified patent and that said Letters Patent is hereby corrected as shown below:

Description of the Preferred Embodiments

Column 4, Line 50
"...side wall 18..." should be --...side walls 18, 20...--

Signed and Sealed this

Sixteenth Day of November, 2010

David J. Kappos
*Director of the United States Patent and Trademark Office*